(12) United States Patent
Ugawa et al.

(10) Patent No.: US 9,282,231 B2
(45) Date of Patent: *Mar. 8, 2016

(54) PHOTOGRAPHING APPARTATUS

(71) Applicant: Olympus Corporation, Shibuya-ku, Tokyo (JP)

(72) Inventors: Akira Ugawa, Tokyo (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,995

(22) Filed: Nov. 8, 2013

(65) Prior Publication Data

US 2014/0063277 A1  Mar. 6, 2014

Related U.S. Application Data

(63) Continuation of application No. 12/847,913, filed on Jul. 30, 2010, now Pat. No. 8,581,994.

(30) Foreign Application Priority Data

Aug. 4, 2009  (JP) .................................. 2009-181733

(51) Int. Cl.
*H04N 5/232* (2006.01)
*H04N 1/00* (2006.01)

(52) U.S. Cl.
CPC ....... *H04N 5/23203* (2013.01); *H04N 1/00283* (2013.01); *H04N 1/00286* (2013.01); *H04N 1/00891* (2013.01); *H04N 1/00973* (2013.01); *H04N 5/232* (2013.01); *H04N 5/23216* (2013.01); *H04N 5/23245* (2013.01); *H04N 5/23296* (2013.01)

(58) Field of Classification Search
USPC ............ 348/333.01, 207.1, 333.13, 372, 730, 348/211.99, 211.2, 211.8, 211.1, 211.4; 345/211; 455/556.1

See application file for complete search history.

(56) References Cited

U.S. PATENT DOCUMENTS

| | | | |
|---|---|---|---|
| 2005/0145774 A1* | 7/2005 | Yang et al. | 250/205 |
| 2006/0115120 A1* | 6/2006 | Taniguchi et al. | 382/104 |
| 2008/0180551 A1* | 7/2008 | Koike | 348/231.99 |
| 2010/0003016 A1* | 1/2010 | Ishimaru | 386/117 |
| 2010/0007767 A1* | 1/2010 | Kawaguchi et al. | 348/231.2 |

\* cited by examiner

*Primary Examiner* — Roberto Velez
*Assistant Examiner* — Stephen Coleman
(74) *Attorney, Agent, or Firm* — John C. Pokotylo; Straub & Pokotylo

(57) ABSTRACT

Controlling a photographing apparatus that can play back an image on an external display device, to achieve energy savings when playing back the image on the external display device is provided. After a photographed image is transmitted to the external display device, if a control signal is sourced by a remote control power to a back-surface LCD 102a and/or the touch panel 102b is turned off.

20 Claims, 9 Drawing Sheets

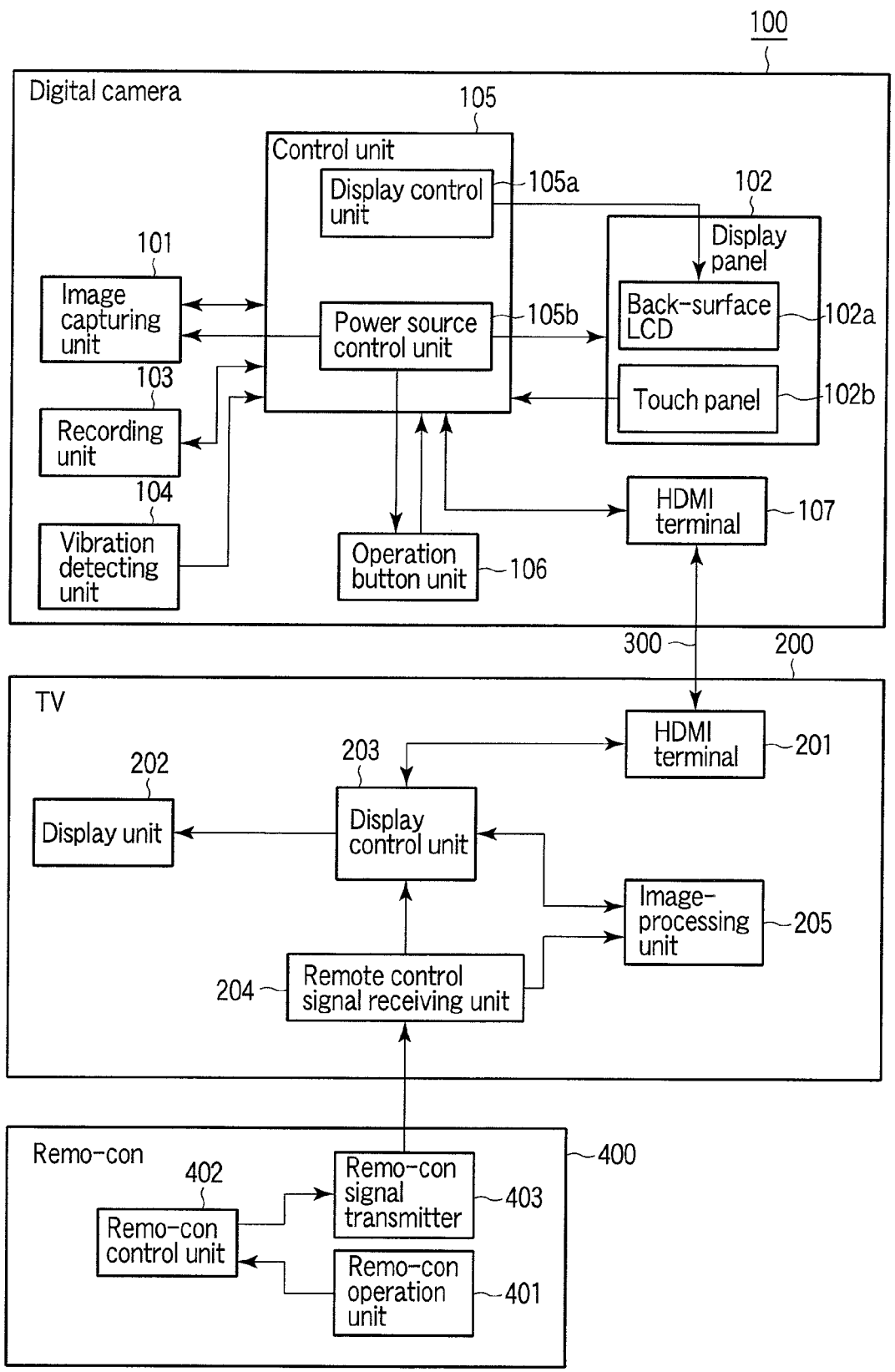
F I G. 1

PHOTOGRAPHING APPARTATUS

This application is a continuation application of U.S. patent application Ser. No. 12/847,913 (referred to as "the '913 application" and incorporated herein by reference), filed on Jul. 30, 2010, titled "PHOTOGRAPHING APPARATUS" and listing Akira UGAWA and Osamu NONAKA as the inventors, the '913 application claiming benefit of Japanese Application No. 2009-181733 filed in Japan on Aug. 4, 2009, the contents of which are incorporated by this reference.

BACKGROUND OF THE INVENTION

1. Field of the Invention

The present invention relates to a photographing apparatus configured to play back images on an external display device.

2. Description of the Related Art

Recently, various systems have been proposed which enable playback of images, which were photographed with a photographing apparatus, on a screen of an external display device. Such systems do so by transmitting the image photographed with the photographing apparatus, such as a digital camera, to the external display device, such as a television receiver (hereafter abbreviated as TV) and the like. For example, Japanese Unexamined Patent Application Publication No. 2007-311927 proposes technology for image playback on the external display device. According to that patent application, a digital camera is connected to a TV via HDMI (High Definition Multimedia Interface) (registered trademark) to enable communication between the digital camera and the TV. The display of high-resolution images on the TV is made possible by transmitting a high-resolution image, played back on the digital camera, to the television receiver.

SUMMARY OF THE INVENTION

Exemplary embodiments consistent with the present invention advantageously provide a photographing apparatus which can achieve energy savings under the above-described scenario—that is, when an image is played back on an external display device.

A photographing apparatus according to a first exemplary embodiment consistent with the present invention includes (1) a display unit for displaying an image, (2) an operation unit for controlling operations of the photographing apparatus, (3) a power source control unit for controlling energy supply for operation of the display unit and the operation unit and (4) a signal transmitter/receiver (i) for transmitting signals to a display device external to the photographing apparatus in order to display the image on the external display device and (ii) for receiving control signals for the photographing apparatus from the external display device. The power source control unit reduces energy supplied to the display unit and/or the operation unit when the signal transmitter/receiver has received the control signals from the display device.

With respect to photographing apparatus having a function to play back an image using a display device, exemplary embodiments consistent with the present invention can provide a photographing apparatus that saves energy when the image is being displayed on the display device.

BRIEF DESCRIPTION OF THE DRAWINGS

FIG. 1 is a diagram showing a structure example of an image playback system comprising a photographing apparatus according to a first embodiment of the present invention.

DESCRIPTION OF THE PREFERRED EMBODIMENTS

Figure 2:
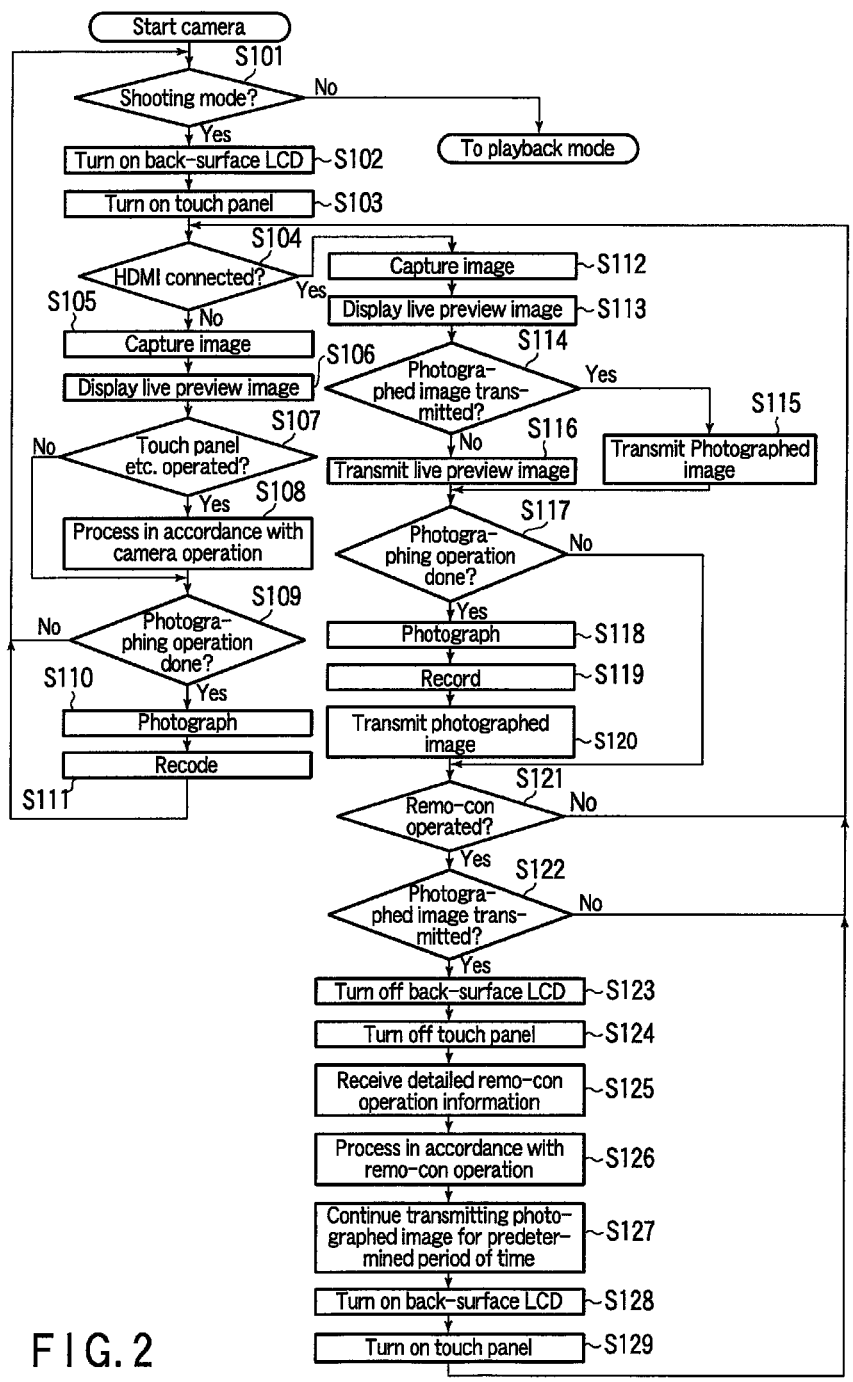
FIG. 2 is a flowchart showing operation in shooting mode after starting the digital camera according to the first embodiment of the present invention.

Referring to the drawings, the embodiments according to the present invention will be described below.

A first embodiment consistent with the present invention will be described. FIG. 1 is a diagram showing the structure of the image playback system including the exemplary photographing apparatus consistent with the first embodiment of the present invention. The image playback system shown in FIG. 1 comprises a digital camera 100 as an example of the photographing apparatus and the television receiver (TV) 200 as an example of a display device, wherein the digital camera 100 and the TV 200 are connected via an HDMI cable 300, enabling communication. Further, the TV 200 is remotely controllable with a remote controller (remo-con) 400.

The exemplary digital camera 100 comprises an image capturing unit 101, a display panel 102, a recording unit 103, a vibration detecting unit 104, a control unit 105, an operation button unit 106 and an HDMI terminal 107.

The image capturing unit 101 comprises, although not shown, for example, lenses for collecting light of an object image and an image pick up device for converting the object image collected by the lenses into an electrical signal. The image capturing unit 101 obtains a still image of the object by capturing the object. A moving image can also be obtained when images are captured continuously by the image capturing unit 101. Hereafter, without distinguishing still images from moving images, these are referred to simply as image.

The display panel 102 comprises a back-surface liquid crystal display (back-surface LCD) 102a and a touch panel 102b. The back-surface LCD 102a, having a function of a display unit, is arranged on, for example, the back surface of the digital camera 100 and displays various images such as images obtained by the capturing unit 101 under control of display control unit 105a in the control unit 105. The touch panel 102b, having a function of an operation unit, and being integrated with the back-surface LCD 102a detects presence or absence of touch with e.g. The user's finger on a button of the touch panel 102b and outputs a signal representing the presence or absence of the touch to the control unit 105.

The image obtained by the image capturing unit. 101 is stored in the recording unit 103. The recording unit 103 is, for example, a semiconductor memory which is designed to be attached to/detached from the digital camera 100.

The vibration detecting unit 104 comprises an angular velocity sensor and the like, detects vibration generated in the body of the digital camera 100 and outputs signals in accordance with the vibration to the control unit 105.

The control unit 105 controls each block in the digital camera 100. For example, the control unit 105 performs operation control of the capturing unit 101 and image-processing of the image obtained by the image capturing unit 101. Additionally, the control unit 105 comprises the display control unit 105a which controls displaying of the image obtained by the image capturing unit 101 or the image stored in the recording unit 103 on the back-surface LCD 102a of the display panel 102. Further, the control unit 105 comprises a power source control unit 105b which controls energy supply necessary for operation of each block in the digital camera 100, by a power source (for example, a secondary battery), which is not shown.

The operation button unit 106 is an operation unit which comprises operation buttons for the user's various operation of the digital camera 100. The control unit 105 operates in accordance with instructions received by operation of the operation button unit 106 by identifying the operation of the operation button unit 106.

The HDMI terminal 107 has a function to act as a signal transmitter and receiver. It is a terminal unit on the digital camera 100 which comprises interface for HDMI communication between the digital camera 100 and the TV 200. Images are transmitted from the digital camera 100 to the TV 200 and control signals for the digital camera 100 are received from the TV 200 via the HDMI terminal 107. Although FIG. 1 shows an example of wired connection between the digital camera 100 and the TV 200 via the HDMI cable 300 to allow HDMI communication, the digital camera 100 and the TV 200 may be connected via wireless interfaces to allow HDMI communication.

The TV 200 comprises an HDMI terminal 201, a display unit 202, a display control unit 203, a remote control signal receiving unit 204 and an image-processing unit 205.

The HDMI terminal 201 is a terminal unit on the TV 200 providing an interface by which the TV 200 communicates with the digital camera 100 via HDMI.

Images received from the digital camera 100 via the HDMI terminal 201 are displayed on the display unit 202 according to the control of the display control unit 203. The display unit 202 comprises a liquid crystal display (LCD), for example. The display unit 202 can also display video based on television broadcasting which is received via an antenna of the TV 200, which is not shown.

The display control unit 203 controls each component (e.g., units and terminals) in the TV 200 such as display operation control of the display unit 202. A remote control signal receiving unit 204 receives a remote control signal from a remote controller (remo-con) 400 of the TV 200. The display control unit 203 operates in accordance with signals transmitted by the remo-con 400 responsive to user input received via the remo-con operation unit 401 and received at the remote control signal receiving unit 204. Additionally, the display control unit 203 transmits a control signal as needed to the digital camera 100, via the HDMI terminal 201 and HDMI cable 300 (e.g., on the Consumer Electronics Control ("CEC" pin)), as a result of identifying the remo-con signal.

The image-processing unit 205 stores an image for image-processing of a photographed image. The image to be provided for image-processing is transmitted to the digital camera 100 when a reflecting instruction is provided by the remo-con 400. Detailed operation of the image-processing unit 205 will be described in the second embodiment.

The remo-con 400 operates as a remote controlling unit and includes a remote controller operation unit 401, a remote controller control unit 402 and a remote control signal transmitter 403.

The remote controller operation unit 401 has various operation buttons by which the user can operate the remo-con 400. The remote controller control unit 402 identifies an operation of the remote controller operation unit 401, generates a remo-con signal in accordance with the operations of the remote controller operation unit 401 and then outputs the remo-con signal to the remote control signal transmitter 403. The remote control signal transmitter 403 transmits the remo-con signal, which was generated in the remote controller control unit 402, to the remote control signal receiving unit 204 of the TV 200 via, for example, infrared communication.

The detailed operation of the exemplary image playback system shown in FIG. 1 will be now described. Note that the TV 200 according to this exemplary embodiment is only described in the context of displaying an image transmitted from the digital camera 100 and transmitting a control signal, representing operation content of the remo-con 400, to the digital camera 100 when the remo-con 400 is operated. For this reason, particularly the operation of the digital camera 100 will be described in the following.

FIG. 2 is a flowchart showing exemplary operations of the digital camera 100 in the shooting mode, after starting the digital camera 100, according to the first embodiment of the present invention. A control unit 105 determines whether operation mode of the digital camera 100 is the shooting mode or not after starting the digital camera 100 (step S101). Note that the operation mode may be set by user's operation of the touch panel 102b or the operation button unit 106. When it is determined at step S101 that the operation mode of the digital camera 100 is not the shooting mode, but rather the playback mode, the control unit 105 performs processing for the playback mode, to be described later.

On the other hand, when it is determined at step S101 that the operation mode of the digital camera 100 is the shooting mode, the control unit 105 turns on the power of the back-surface LCD 102a to start displaying a live preview image (step S102). Further, the control unit 105 turns on the touch panel 102b (step S103).

After turning on the power of the back-surface LCD 102a and the touch panel 102b, the control unit 105 determines whether the TV 200 is connected with the digital camera 100 via the HDMI cable 300 or not (step S104). This determination is made based on a signal status of the HDMI terminal 107. When an HDMI connection is not determined at step S104, the control unit 105 turns on the image capturing unit 101 and obtains an image by making the image capturing unit 101 capture the image (step S105). Subsequently, the control unit 105 performs image-processing for displaying a live preview image (for example, reduction processing) of the live preview image obtained by the operation of the image capturing unit 101, and then the control unit 105 performs live preview image display by which the processed live preview image is displayed on the back-surface LCD 102a (step S106). Such a live preview image display enables the user to decide when to take a photograph, photograph composition and the like. Although not shown in FIG. 2, the control unit 105 may also calculate a fine exposure amount based on the brightness of an image obtained via the image capturing unit 101 when the live preview image is displayed.

After displaying the live preview image, the control unit 105 determines whether the touch panel 102b or an operation button unit 106 has been operated by the user (step S107). When it is determined at step S107 that the touch panel 102b or the operation button unit 106 has been operated, the control unit 105 performs processing in accordance with the user input received via the touch panel 102b or via the button unit 106 (for example, mode setting and photographing condition setting) (step S108). On the other hand, when it is determined at step S107 that the touch panel 102b or the operation button unit 106 has not been operated, the control unit 105 skips the process of step S108.

After steps S107 and S108, the control unit 105 determines whether or not a photographing operation has been performed by the user (step S109). Whether photographing operation has been performed or not may be determined by, for example, a determination of whether a release button (which is included in the operation button unit 106) has been pressed or not by the user. When it is determined at step S109 that the photographing operation has not been performed, the process returns to step S101 and the control unit 105 performs the operation mode determination again. On the other hand, when it is determined at step S109 that the photographing operation has been performed, the control unit 105 obtains the image by operating the image capturing unit 101 according to the exposure amount calculated when displaying the live preview image (step S110). After this photographing operation, the control unit 105 applies image-processing (for recording purposes) to the photographed image obtained by the photographing operation (for example, compression processing) and then records this image-processed photographed image in the recording unit 103 (step S111). The Photographed images obtained by photographing can be recorded together in a folder. In the following description, each folder which records the plurality of the photographed images is called an album. After recording the photographed image at step S111, the process returns to step S101 and the control unit 105 performs the operation mode determination again.

Referring back to step S104, when HDMI connection is determined at step S104, the image is transmitted from the digital camera 100 to the TV 200 and displayed. For this, the control unit 105 turns on the image capturing unit 101 and obtains the image by making the image capturing unit 101 capture the image (step S112). Subsequently, the control unit 105 performs image-processing for displaying the live preview image (for example, reduction processing) of the live preview image obtained by the operation of the image capturing unit 101. The control unit 105 then displays the live preview image, by which the processed live preview image is displayed, on the back-surface LCD 102a (step S113).

After displaying the live preview image, the control unit 105 determines whether the photographed image has been transmitted to the TV 200 or not (step S114). When it is determined at step S114 that the photographed image has been transmitted at step S120, which will be described later, the control unit 105 transmits the transmitted image to the TV 200 again via the HDMI terminal 107 (step S115). On the other hand, when it is determined at step S114 that the photographed image has not been transmitted, the control unit 105 transmits the live preview image to the TV 200 via the HDMI terminal 107 (step S116). Steps S115 and S116 allow either the photographed image or the live preview image to be displayed on the display unit 202 of the TV 200 via HDMI communication.

After transmitting the image, the control unit 105 determines whether photographing operation has been performed by the user (step S117). When it is determined at step S117 that the photographing operation has been performed, the control unit 105 obtains an image by making the image capturing unit 101 operate according to the exposure amount calculated when displaying the live preview image (step S118). After these photographing operations, the control unit 105 performs image-processing for the photographed image obtained by the photographing operation for recording purpose (for example, compression processing) and then records the photographed image in the recording unit 103 after the image-processing of the photographed image (step S119). After that, the control unit 105 transmits the photographed image recorded on the recording unit 103 to the TV 200 via the HDMI terminal 107 (step S120). On the other hand, when it is determined at step S117 that the photographing operation has not been performed, the control unit 105 skips the processings of steps S118 to S120.

After step S117 or S120, the control unit 105 determines whether the remo-con 400 has been operated or not by the user. This determination is made based on whether or not the control signal has been received by the HDMI terminal 107 (step S121) (via the remote control signal receiving unit 204, the display control unit 203 the HDMI terminal 201 and the HDMI cable 300). When it is determined at step S121 that the control signal has not been received, the process returns to step S104. In this case, the control unit 105 determines again whether there is HDMI connection or not. On the other hand, when it is determined at step S121 that the control signal has been received by the HDMI terminal 107, the control unit 105 determines whether the photographed image has been transmitted to the TV 200 or not (step S122). When it is determined at step S122 that the photographed image has not been transmitted, the process returns to step S104. In this case, the control unit 105 determines again whether there is HDMI connection or not.

On the other hand, when it is determined at step S122 that the photographed image has been transmitted, the control unit 105 turns off the power of the back-surface LCD 102a (step S123), turns off the power of the touch panel 102b (step S124), or both.

After turning off the power of the back-surface LCD 102a and/or the touch panel 102b, the control unit 105 receives a control signal representing details of remo-con 400 operation via the HDMI terminal 107 (step S125) (via the remote control signal receiving unit 204, the display control unit 203 the HDMI terminal 201 and the HDMI cable 300). Subsequently, the control unit 105 performs processing in accordance with the operation of the remo-con 400 based on the received control signal (for example, switching of photographed images being transmitted) (step S126). After that, the control unit 105 continues transmitting the photographed image to the TV 200 via the HDMI terminal 107 for a predetermined period of time (step S127). Subsequently, after a predetermined period of time has elapsed, the control unit 105 turns on the power of the back-surface LCD 102a (if off) (step S128), and turns on the power of the touch panel 102b (if off) (step S129). After that, the process returns to step S104 and the control unit 105 again determines whether there is HDMI connection or not.

In the foregoing exemplary embodiment, when the photographed image has been transmitted to the TV 200 (the photographed image is currently being displayed on the TV 200) and the remo-con 400 has been operated, the back-surface LCD 102a and/or the touch panel 102b are turned off. That is, the user will normally not operate the digital camera 100 when the photographed image is currently being displayed on the TV 200 and the remo-con 400 has been operated (within a predetermined time). Since displaying the live preview image using the back-surface LCD 102a can be assumed to be a waste of electricity during such a period of time, energy savings is achieved by turning off the power of the back-surface LCD 102a according to the embodiment. Further, since the buttons on the touch panel 102b cannot be seen when the back-surface LCD 102a is turned off, the touch panel 102b is also turned off as (or just after) the back-surface LCD 102a is turned off.

Further, in the shooting mode, the back-surface LCD 102a and the touch panel 102b are turned back on after elapse of a predetermined period of time even after the back-surface LCD 102a and the touch panel 102b have been turned off. Consequently, occurrence of the trouble can be reduced where the back-surface LCD 102a display cannot be seen when photographing is conducted again after transmitting the photographed image.

The foregoing exemplary embodiment is not limited to the case where both the back-surface LCD 102a and the touch panel 102b are turned off. Rather, either one may be turned off. Alternatively, the energy amount to be supplied to the back-surface LCD 102a and/or the touch panel 102b may be reduced instead of a full power-off.

Figure 3:
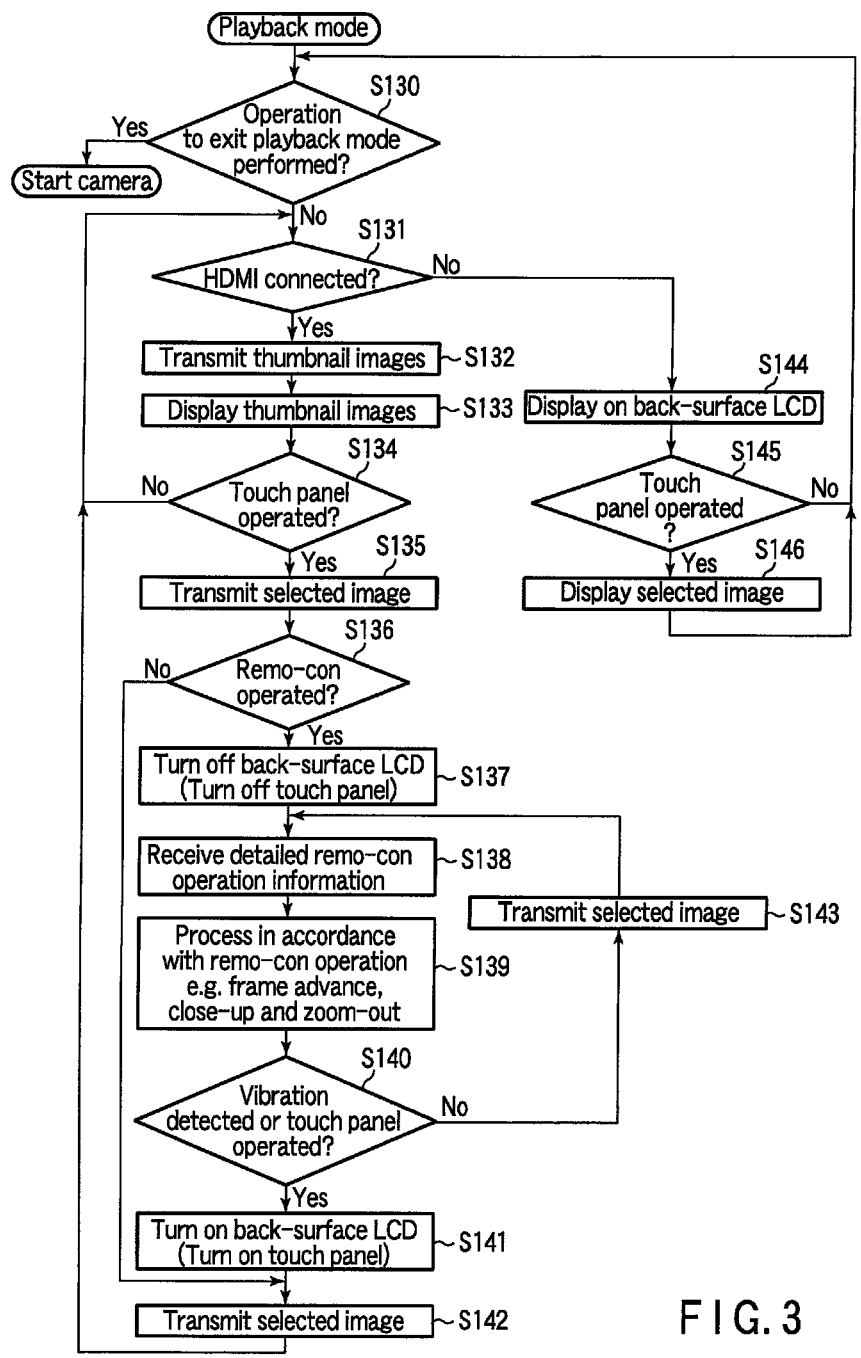
FIG. 3 is a flowchart showing operation in playback mode of the digital camera.

FIG. 3 is a flowchart showing the operation of the digital camera 100 in the playback mode of the digital camera 100. In FIG. 3, the control unit 105 determines whether or not the user has performed an operation to exit the playback mode (step S130). The exit operation of the playback mode is an operation for changing the operation mode to the shooting mode, for example. When it is determined at step S130 that the exit operation of the playback mode has been performed, the control unit 105 performs processing after camera start up, as shown in FIG. 2.

Figure 4:
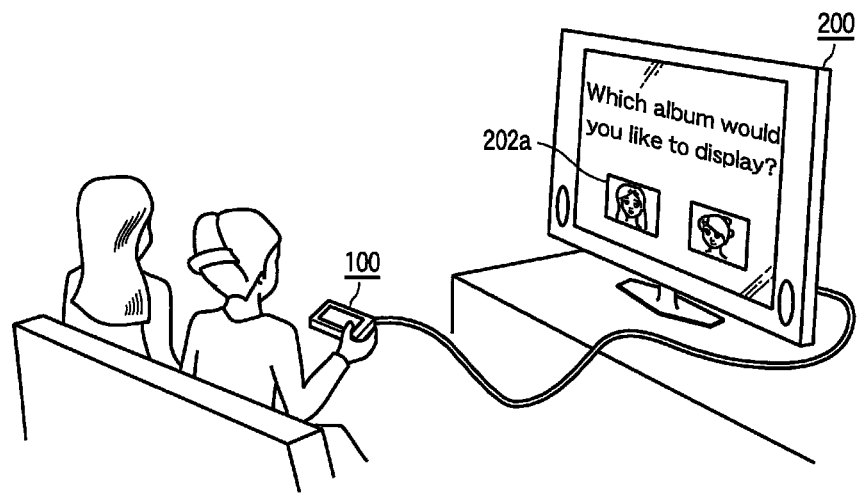
FIG. 4 illustrates an example of thumbnail image display representing an album on a TV screen.

On the other hand, when it is determined at step S130 that the exit operation of the playback mode has not been performed, the control unit 105 determines whether or not the TV 200 is connected with the digital camera 100 via the HDMI cable 300 based on signal status of the HDMI terminal 107 (step S131). When HDMI connection is determined at step S131, the control unit 105 transmits a thumbnail image representing each album in the recording unit 103 to the TV 200 via the HDMI terminal 107 (step S132). Thus, as shown in FIG. 4, for example, thumbnail image 202a representing an album is displayed on the display unit 202 of the TV 200. Alternatively, at step S132, for example, a specific image such as the latest photographed image stored in the recording unit 103 can be transmitted instead of transmitting the thumbnail image representing an album.

After transmitting the thumbnail image, the same thumbnail image as has been transmitted to the TV 200 is displayed on the back-surface LCD 102a by the control unit 105 (step S133). After that, the control unit 105 determines whether the touch panel 102b has been operated or not by the user (step S134). When it is determined at step S134 that the touch panel 102b has been operated, the control unit 105 transmits photographed images, which have been selected according to the operation of the touch panel 102b (selected image(s)), to the TV 200 via the HDMI terminal 107 (step S135). On the other hand, when it is determined at step S134 that the touch panel 102b has not been operated, the process returns to step S131.

Figure 5:
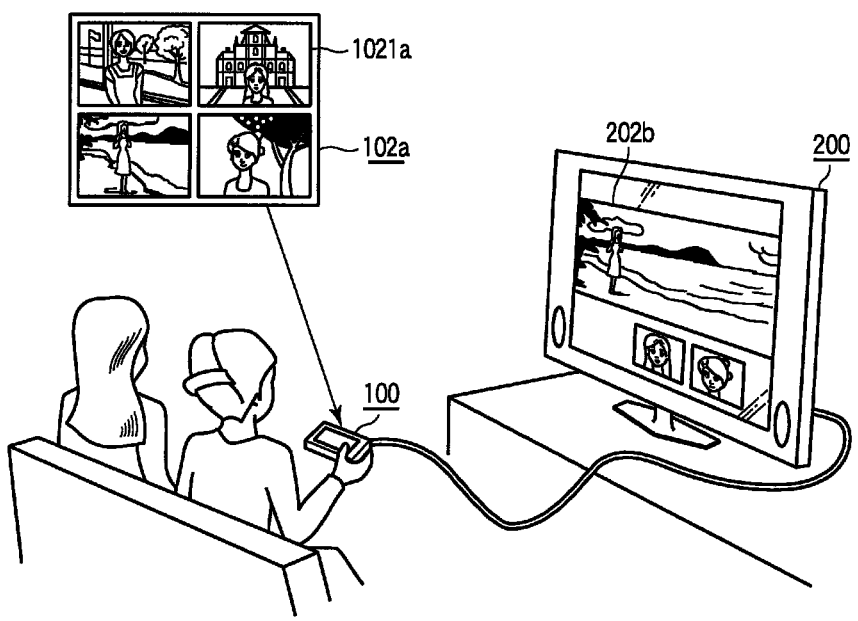
FIG. 5 illustrates an exemplary display of thumbnail images on a digital camera screen representing photographed images stored in an album.

For example, during display as shown in FIG. 4, if the user operates the touch panel 102b and selects an album displayed on the back-surface LCD 102a, as shown in FIG. 5, thumbnail images 1021a representing the photographed images recorded on each album are displayed on the back-surface LCD 102a. If the user selects a thumbnail image 1021a, the selected image is transmitted to the TV 200. Thus, the selected image 202b is displayed on the display unit 202 of the TV 200. As described, by enabling the selection of the image for display on the TV 200 on the display panel 102 of the digital camera 100, an undesired display on the TV 200 of an image (which the user does not want to display on the TV 200) can be avoided.

Figure 6:
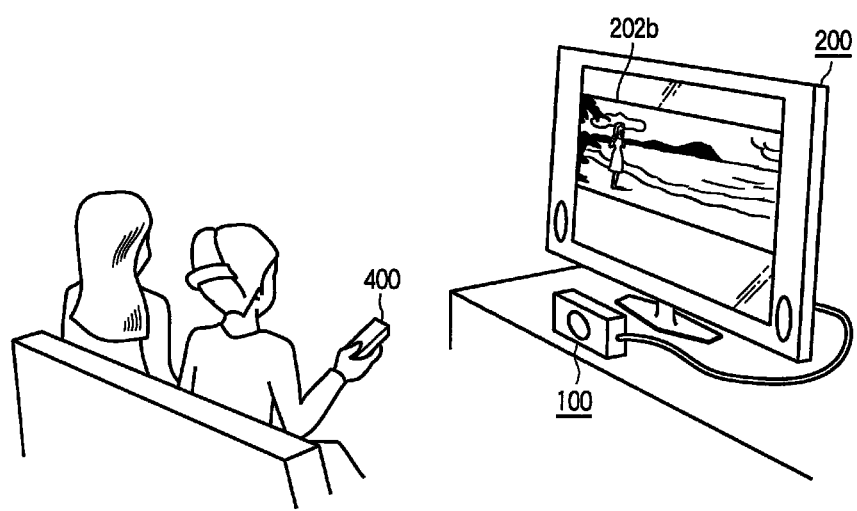
FIG. 6 illustrates an example of remote controller operation after a photographed image is displayed on a TV screen.

After displaying the selected image on the display unit 202 of the TV 200 as shown in FIG. 5, it is more natural for many users to operate the remo-con 400, with which sound volume can be controlled and colors and the like can be adjusted as shown in FIG. 6, rather than operating the digital camera 100. Thus, basically, subsequent operations shall be performed by operating the remo-con 400. For this, after transmitting the selected image, the control unit 105 determines whether the remo-con 400 has been operated or not by the user, that is, whether a control signal has been received or not via the HDMI terminal 107 (via the remote control signal receiving unit 204, the display control unit 203 the HDMI terminal 201 and the HDMI cable 300) (step S136). When it is determined at step S136 that the control signal has been received, the power of the back-surface LCD 102a is turned off by the control unit 105 (step S137). The touch panel 102b may also be turned off.

After turning off the power of the back-surface LCD 102a (and the touch panel 102b), the control unit 105 receives a control signal representing details of operation of the remo-con 400 via the HDMI terminal 107 (via the remote control signal receiving unit 204, the display control unit 203 the HDMI terminal 201 and the HDMI cable 300) (step S138). Subsequently, the control unit 105 performs processing in accordance with the operation of the remo-con 400 based on the received control signal (for example, frame advance, zoom-in and zoom-out) (step S139). For example, in case of frame advance, the control unit 105 transmits a photographed image, whose photographing date and time is the second newest after the selected image which was transmitted at step S135, as a new selected image to the TV 200. On the other hand, in the case of zoom-in or zoom-out, the control unit 105 transmits a zoomed-in (close-up) or zoomed-out version of the selected image which was transmitted at step S135 as a new selected image to the TV 200.

After performing processing in accordance with the operation of the remo-con 400, the control unit 105 determines whether vibration of the digital camera 100 has been detected (which may indicate that the user has picked up the digital camera) or whether the touch panel 102b has been operated by the user (when the touch panel was not turned off at step S137) (step S140) based on output from the vibration detecting unit 104. When it is determined at step S140 that vibration of the digital camera 100 has been detected or when it is determined that the touch panel 102b has been operated, the control unit 105 turns on the power of the back-surface LCD 102a (and the touch panel 102b) (step S141). Subsequently, the control unit 105 transmits the selected image to the TV 200 via the HDMI terminal 107 (step S142). After that, the process returns to step S131.

In the foregoing embodiment, even in the playback mode, when the photographed image is currently being displayed on the TV 200 and the remo-con 400 is operated, energy savings is achieved by turning off the power of the back-surface LCD 102a (and/or the touch panel 102b). Additionally, when vibration of the digital camera 100 has been detected or when the touch panel 102b has been operated, the back-surface LCD 102a (and the touch panel 102b) are turned back on. This enables immediate selection of the photographed image using the digital camera 100.

On the other hand, when it is determined at step S140 that the vibration of the digital camera 100 has not been detected and that the touch panel 102b has not been operated, the control unit 105 transmits the selected image to the TV 200 via the HDMI terminal 107 (step S143). After that, the process returns to step S138.

Referring back to step S131, when an HDMI connection is not determined at step S131, the thumbnail image representing each album in the recording unit 103 is displayed on the back-surface LCD 102a by the control unit 105 (step S144). After displaying the thumbnail images, the control unit 105 determines whether the touch panel 102b has been operated or not by the user (step S145). When it is determined at step S145 that the touch panel 102b has not been operated, the process returns to step S130. On the other hand, when it is determined at step S145 that the touch panel 102b has been operated, the control unit 105 displays the photographed image which has been selected according to the operation of the touch panel 102b (selected image) on the back-surface LCD 102a (step S146). After that, the process returns to step S130. In this case, the control unit 105 determines again whether the exit operation of the playback mode has been performed or not.

In the foregoing embodiment, after operating the remo-con 400 while the photographed image is displayed on the TV 200, energy savings is achieved by turning off the power of the back-surface LCD 102a and the touch panel 102b. Alternatively, appropriate energy savings control for the shooting mode as well as for the playback mode is achieved by choosing different conditions of turning on the power of the back-surface LCD 102a and the touch panel 102b for each of other modes.

Figure 7A:
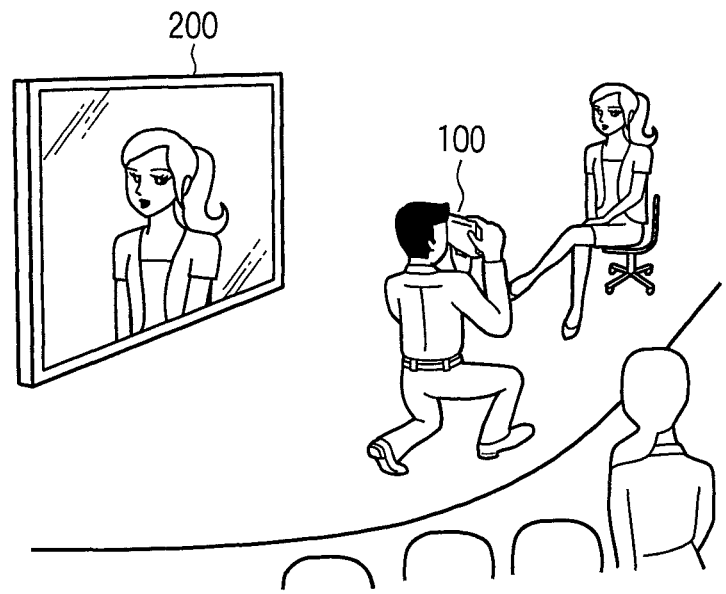
FIGS. 7A and 7B show a usage example of the image playback system according to the first embodiment of the present invention.
Figure 7B:
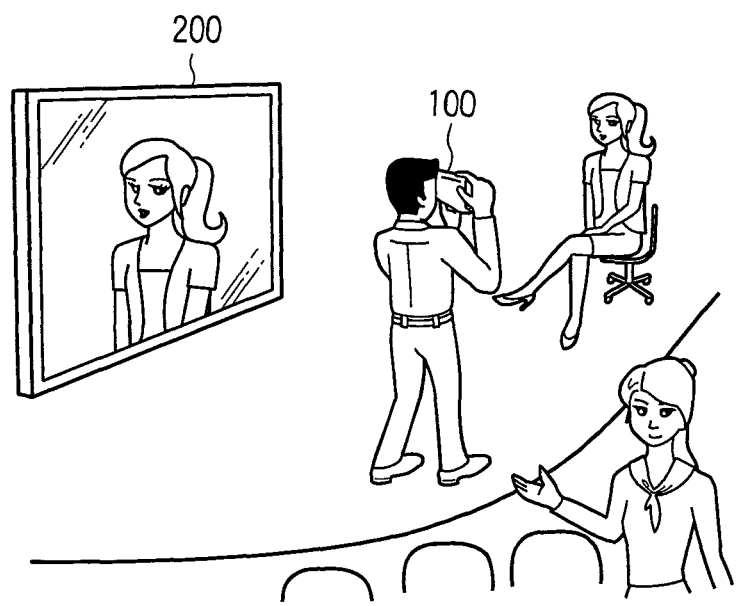

The image playback system shown in FIG. 1 can be used, for example, as shown in FIG. 7A, when an image which is to be photographed with the digital camera 100 (a live preview image) is enlarged on the TV 200 to be viewed by many users and/or, as shown in FIG. 7B, when a photographed image obtained by photographing is enlarged and viewed on the TV 200. When considering such uses, users might not be able to sufficiently view the photographed image if the next photographing is performed quickly thereafter. Therefore, after starting to transmit the photographed image, the same image is transmitted repeatedly for a predetermined period of time so that the same photographed image can be displayed on the TV 200. The process is shown in FIG. 2 as step S127. The period of time to transmit the same image may be adjusted (e.g., extended) by, for example, operation of the remo-con 400.

Further, it may be preferable to display the live preview image on the back-surface LCD 102a of the digital camera 100 in preparation for the next photographing even while the photographed image is repeatedly transmitted to the TV 200.

Next, a second embodiment of the present invention will be described. The structure of the image playback system shown in FIG. 1 can be used in this second embodiment. Therefore, its description is omitted.

Figure 8A:
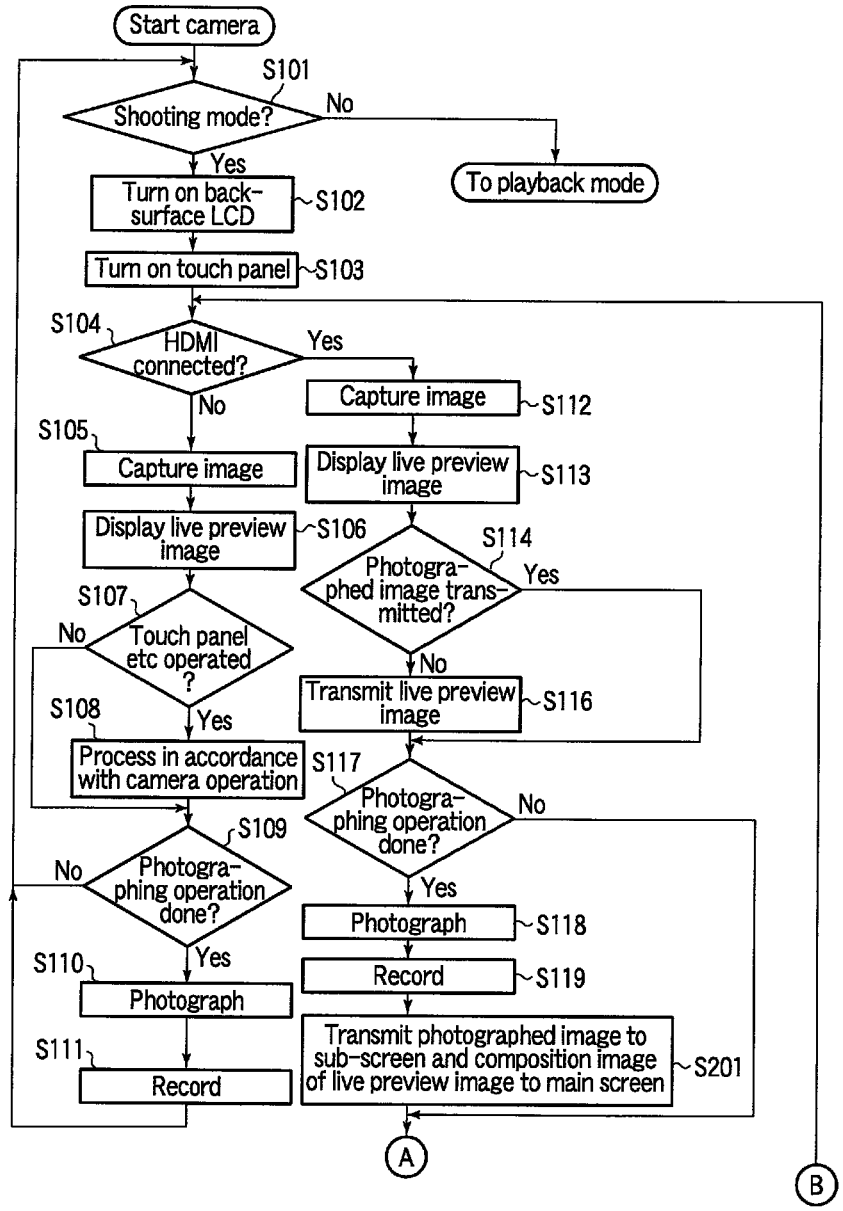
FIGS. 8A and 8B are flowcharts showing operation in the shooting mode after starting the digital camera according to a second embodiment of the present invention.
Figure 8B:
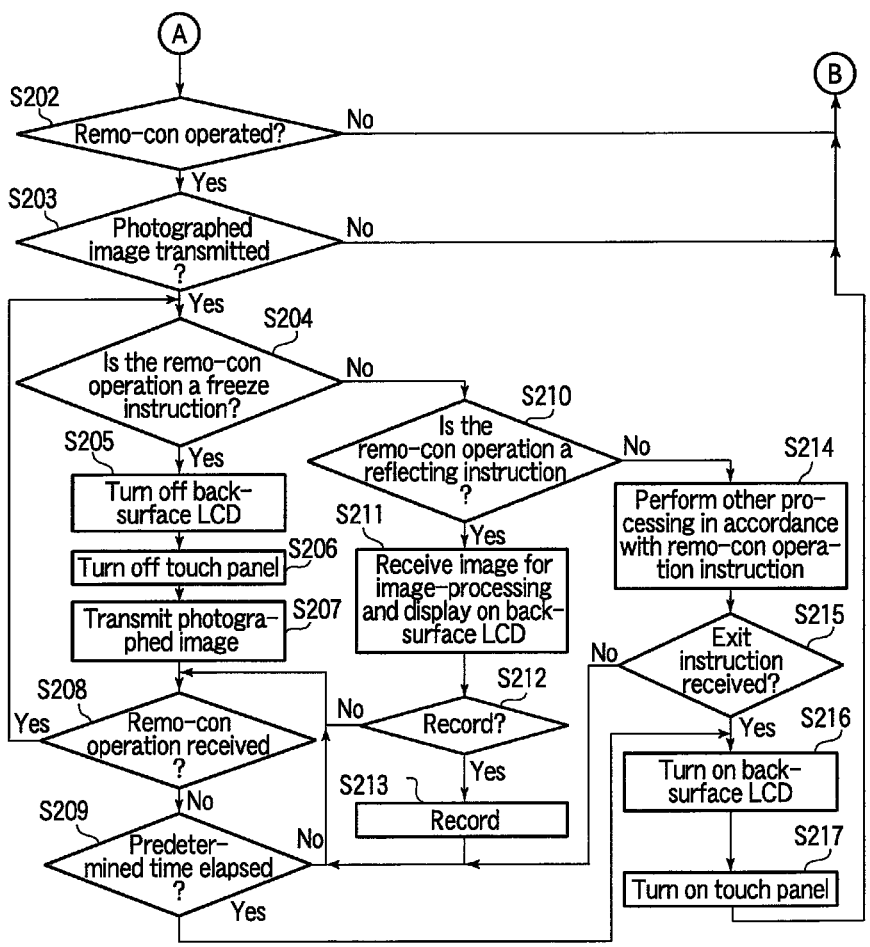

FIGS. 8A and 8B are flowcharts showing the operation in the shooting mode after starting the digital camera 100 according to the second embodiment of the present invention. The description of the same processing in FIGS. 8A and 8B as in FIG. 2 is omitted. However, such steps are assigning the same step numbers in FIGS. 8A and 8B as in FIG. 2. That is, the processing of steps S101 to S119 in FIGS. 8A and 8B is the same as those in FIG. 2. However, the processing of step S115 in FIG. 2 is not performed in FIGS. 8A and 8B and the processing of step S117 is performed without the processing of step S115 when determined at step S113 that the photographed image has been transmitted.

Figure 9A:
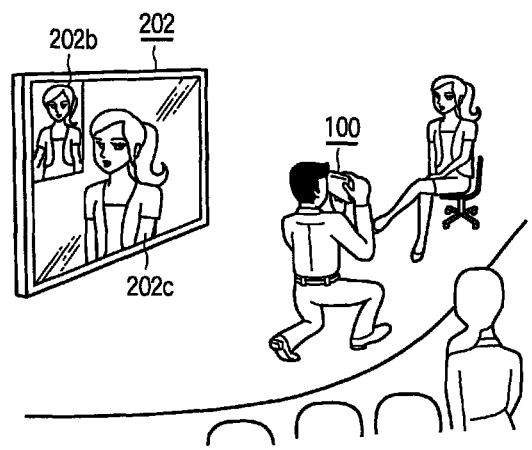
FIGS. 9A and 9B show a usage example of an image playback system according to the second embodiment of the present invention.

At step S119, after recording the photographed image in the recording unit 103, the control unit 105 composes the photographed image and the live preview image, and then transmits the resulting composition image of the photographed image and the live preview image to the TV 200 (step S201). At step S201, as shown in FIG. 9A, for example, the composition image is generated where a photographed image 202b is put a in sub-screen of the display unit 202 of the TV 200 (for example, the small area at top-left in the display) and a live preview image 202c is put in a main-screen of the display unit 202 of the TV 200 (entire area of the display). For this, the control unit 105 generates the composition of the photographed image on top-left of the live preview image obtained via the image capturing unit 101.

After transmitting the composition image, the control unit 105 determines whether the remo-con 400 has been operated by the user, that is, whether a control signal has been received or not via the HDMI terminal 107 (via the remote control signal receiving unit 204, the display control unit 203 the HDMI terminal 201 and the HDMI cable 300) is determined (step S202). When it is determined at step S202 that the control signal has not been received, the process returns to step S104. In this case, the control unit 105 determines again whether there is an HDMI connection or not. On the other hand, when it is determined at step S202 that the control signal has been received, the control unit 105 determines whether the photographed image (including the composition image acquired by conforming with the live preview image) has been transmitted to the TV 200 or not (step S203). When it is determined at step S203 that the photographed image has not been transmitted, the process returns to step S104. In this case, the control unit 105 determines again whether there is an HDMI connection or not.

On the other hand, when it is determined at step S203 that the photographed image has been transmitted, the control unit 105 identifies the control signal and determines whether the operation content of the remo-con 400 is a freeze instruction or not (step S204). The freeze instruction is an instruction provided by the user with the remo-con 400 when the user wants to view for a longer time the photographed image displayed on the display unit 202 of the TV 200.

When it is determined at step S204 that the operation content is a freeze instruction, the control unit 105 turns off the power of the back-surface LCD 102a (step S205). Subsequently (or concurrently), the control unit 105 may also turn off the power of the touch panel 102b (step S206). After turning off the power of the back-surface LCD 102a and/or the touch panel 102b, the control unit 105 transmits, without composing the photographed image with the live preview image, the photographed image which has been transmitted to the TV 200 via the HDMI terminal 107 (step S207). Subsequently, the control unit 105 determines whether the remo-con 400 has been operated by the user (That is, whether the control signal has been received or not via the HDMI terminal 107 (via the remote control signal receiving unit 204, the display control unit 203 the HDMI terminal 201 and the HDMI cable 300)) (step S208). When it is determined at step S208 that the control signal has been received, the process returns to step S204. In this case, the control unit 105 determines again whether the operation content of the remo-con 400 is a freeze instruction or not. On the other hand, when it is determined at step S208 that the control signal has not been received, the control unit 105 determines whether a predetermined time has elapsed or not (step S209). When it is determined at step S209 that the predetermined time has not elapsed, the process returns to step S208. On the other hand, when it is determined at step S209 that the predetermined time has elapsed, the process proceeds to step S216. The process of step S216 will be described later.

The processings of steps S207 to S209 cause the same photographed image to be displayed on the display unit 202 of the TV 200 when the remo-con is not operated for the predetermined period of time after the freeze instruction. Additionally, energy savings of the digital camera 100 is achieved by turning off the power of the back-surface LCD 102a and/or the touch panel 102b.

Figure 9B:
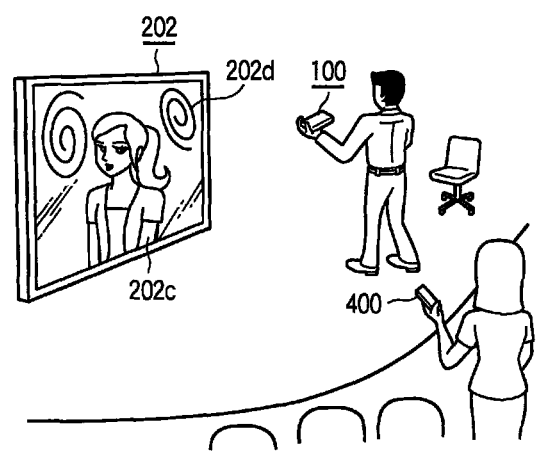

Referring back to step S204, when it is determined at step S204 that the operation content is not a freeze instruction, the control unit 105 determines whether the operation content is a reflecting instruction or not (step S210). The reflecting instruction is an instruction which is instructed by the user's remo-con 400 operation when the user wants to perform a predetermined image-processing (See, for example, 202d of FIG. 9B.) to the photographed image which is displayed on the display unit 202 of the TV 200. If the user operates the remo-con 400 while the live preview image 202c is displayed on the display unit 202 of the TV 200, the image for image-processing stored in the image-processing unit 205 of the TV 200 is superposed on the live preview image 202c as shown in FIG. 9B with a referential mark 202d. In this condition, the user can move display position of the processed image 202d by operating the remo-con 400. Further, if the display position of the processed image 202d is confirmed by operating the remo-con 400, the image for image-processing stored in the image-processing unit 205 of the TV 200 and information of the superposing position are sent to the digital camera 100 as a reflecting instruction. Alternatively, a plurality of types of the images for image-processing may be stored in the image-processing unit 205 so that the user can select the desired image for image-processing from the plurality of types of the images for image-processing.

When it is determined at step S210 that the operation content is a reflecting instruction, the control unit 105 superposes the processed image transmitted from the TV 200 on the live preview image currently being displayed on the back-surface LCD 102a (step S211). Subsequently, the control unit 105 determines whether a recording instruction has been conducted or not (step S212). Whether the recording instruction has been conducted or not is determined by, for example, a determination of whether a release button which is included in the operation button unit 106 has been pressed or not by the user. When it is determined at step S212 that the recording instruction has not been conducted, the process proceeds to step S208. In this case, the control unit 105 determines again whether the remo-con 400 has been operated by the user, that is, whether a control signal has been received or not via the HDMI terminal 107 (via the remote control signal receiving unit 204, the display control unit 203 the HDMI terminal 201 and the HDMI cable 300). When it is determined at step S212 that the recording instruction has been conducted, the control unit 105 performs image-processing for recording purpose for the live preview image being obtained by the image capturing unit 101 and then records it in the recording unit 103 (step S213). When the processed image is being superposed, the processed image is combined with the live preview image and then recorded on the recording unit 103. After the process of the step S213, the process returns to step S208.

Processings of steps S211 to S213 enable recording the same image as the live image with superposed processed image, which is being displayed on the display unit 202 of the TV 200, in the recording unit 103 of the digital camera 100. This technology can allow viewer participation use by which the viewer of the image can "decorate, via the remo-con 400, the image which is currently being displayed on the display unit 202 of the TV 200.

When it is determined at step S210 that the operation content of the remo-con 400 is not a reflecting instruction, the control unit 105 performs processing in accordance with a remo-con operation instruction other than freeze instruction and a reflecting instruction (for example, frame advance, zoom-in, zoom-out) (step S214). Subsequently, the control unit 105 determines whether a control signal representing an exit instruction has been received or not via the HDMI terminal 107 (via the remote control signal receiving unit 204, the display control unit 203 the HDMI terminal 201 and the HDMI cable 300) (step S215). The user performs the exit operation using the remo-con 400 to quit the display of the photographed image on the display unit 202 of the TV 200. Upon receiving this, a control signal representing the exit instruction is transmitted from the TV 200 to the digital camera 100. When it is determined at step S215 that the control signal representing the exit instruction has not been received, the process returns to step S208. In this case, the control unit 105 determines again whether the remo-con 400 has been operated or not by the user (That is, whether the control signal has been received or not via the HDMI terminal 107 (via the remote control signal receiving unit 204, the display control unit 203 the HDMI terminal 201 and the HDMI cable 300)). On the other hand, when it is determined at step S215 that the control signal representing the exit instruction has been received, the control unit 105 turns on the power of the back-surface LCD 102a (step S216). Further, the control unit 105 turns on the power of the touch panel 102b (step S217). Then, the process returns to step S104.

The second embodiment also achieves energy savings by turning off the power of the back-surface LCD 102a and of the touch panel 102b when the user is likely not viewing the back-surface LCD 102a of the digital camera 100 and during the period when it is unlikely that the touch panel 102b will be operated.

The present invention has been described above based on the exemplary embodiments, but is not limited to the above-described embodiments and there can be variations in various shapes and applications of the present invention within the scope of the present invention.

Further, the above-mentioned embodiments include various phases of the invention so that various inventions can be extracted by appropriate combinations of a plurality of disclosed structure elements. For example, even if some structure elements are deleted from the entirety of the structure elements which are shown in the embodiments, if the above-mentioned problems can be solved and similar effect(s) to the above can be obtained, the structure where these structure elements have been deleted can also used.

What is claimed is:

1. A photographing apparatus comprising:
   a) an image capturing unit for generating an image signal from an obtained optical image of an object;
   b) a display unit configured to display at least one of an image or photographing apparatus information;
   c) an operation unit configured to receive manual user input instructions for controlling operations of the photographing apparatus;
   d) a signal transmitter/receiver unit configured to (i) transmit a signal to a display device external to the photographing apparatus in order to display the image on the display device, and (ii) receive a control signal for the photographing apparatus from the display device;
   e) a power source control unit configured to control power supplied to the display unit and the operation unit, wherein the power source control unit reduces the power supplied to at least one of the display unit or the operation unit responsive to the receipt of a control signal, from the display device, by the signal transmitter/receiver unit; and f) a control unit configured to control the image capturing unit, the signal transmitter/receiver unit, the display unit, and the operation unit, wherein the control signal received from the display device is based on a remote control command transmitted from an external remote-control device, and received by the display device, and the control signal is based on whether the external remote-control device is operated by a user, wherein while the power source control unit reduces the power supplied to at least one of the display unit or the operation unit, the control unit performs processing of switching of photographed images being transmitted by the signal transmitter/receiver unit in accordance with an operation of the external remote-control device based on the remote control command received by the display device, and wherein when the power source control unit reduces the power supplied to at least one of the display unit or the operation unit responsive to the receipt of a control signal, from the display device, by the signal transmitter/receiver unit, the power source control unit does so without turning off the power supplied to the photographing apparatus such that the control unit remains operable to perform processing in accordance with an operation of the external remote-control device based on the remote control command received by the display device even while the power supplied to the at least one of the display unit or the operation unit is reduced.

2. The photographing apparatus of claim 1 wherein reducing the power supplied to at least one of the display unit and the operation unit by the power source control unit comprises stopping the supplied power.

3. The photographing apparatus of claim 1 wherein the display unit is integrated with the operation unit.

4. The photographing apparatus of claim 1 wherein the power source control unit stops the reduction of power supply responsive to the detection of an elapse of a predetermined period of time after a start of the reduction of power supply.

5. The photographing apparatus of claim 1 having a shooting mode for photographing and a playback mode for displaying a recorded image, wherein after reducing power supplied to at least one of the display unit or the operation unit, the power source control unit (A) stops the reduction of power supply responsive to the detection of an elapse of a predetermined period of time after a start of the reduction of power supply when the photographic apparatus is in the shooting mode, and (B) maintains the reduction of power supply responsive to the detection of an elapse of a predetermined period of time after a start of the reduction of power supply when the photographic apparatus is in the playback mode.

6. The photographing apparatus of claim 1 wherein the operation unit comprises a touch panel, and wherein when the display unit is supplied with reduced power, the power source control unit stops the reduction of supplied power to the display unit responsive to a detection of an operation of the touch panel.

7. The photographing apparatus of claim 1 further comprising:

f) a vibration detecting unit, wherein when the power source control unit reduces power supplied to at least one of the display unit or the operation unit, the power source control unit stops the reduction of power supplied responsive to a detection of vibration of the photographic apparatus by the vibration detecting unit.

8. The photographing apparatus of claim 1 wherein the control signal received from the display device is based on a user operation of a remote-control device causing the transmission of a remote control command received by the display device, wherein the remote control command is at least one of a frame advance, a zoom-in, or a zoom-out, wherein the photographing apparatus generates a second image based on the control signal received, and wherein photographing apparatus transmits the second image to the display device via the signal transmitter/receiver unit.

9. The photographing apparatus of claim 1 wherein the control signal received from the display device is based on a user operation of a remote-control device causing the transmission of a remote control command received by the display device, and wherein the control signal is a freeze instruction.

10. The photographing apparatus of claim 1 wherein reducing the power supplied to at least one of the display unit or the operation unit by the power source control unit stops the power supplied.

11. A method for controlling a digital camera used in a system including an external display device and an external remote control unit, the digital camera including an image capturing unit, a signal transmitter/receiver unit, a display unit and an operation unit for receiving manual user input instructions for controlling operations of the digital camera, the method comprising:

a) providing power to both the display unit and the operation unit;

b) transmitting image information for display on the external display device;

c) receiving a control signal from the external display device, the control signal being based on a remote control command transmitted from an external remote-control device, and received by the external display device, and the control signal being based on whether the external remote-control device is operated by a user;

d) reducing the power supplied to at least one of the display unit or the operation unit responsive to the receipt of the control signal;

e) performing processing to control the image capturing unit, the signal transmitter/receiver unit, the display unit and the operation unit, in accordance with an operation of the external remote-control device based on the remote control command received by the display device; and f) switching photographed images being transmitted by the signal transmitter/receiver unit in accordance with an operation of the external remote-control device based on the remote control command received by the display device while the power supplied to at least one of the display unit or the operation unit is reduced, wherein when the power supplied to at least one of the display unit or the operation unit is reduced responsive to the receipt of a control signal, such reduction is done without turning off the power supplied to the digital camera such that processing in accordance with an operation of the external remote-control device based on the remote control command received by the remote display device is performed even while the power supplied to the at least one of the display unit or the operation unit is reduced.

12. The method of claim 11 further comprising:
g) starting a timer responsive to the reduction of the power supplied to at least one of the display unit or the operation unit;
h) determining that a predetermined time has elapsed using the timer; and
i) restoring the power supplied to at least one of the display unit or the operation unit responsive to the determination that the predetermined time has elapsed.

13. The method of claim 11 further comprising:
g) detecting a vibration of the digital camera; and
h) restoring the power supplied to at least one of the display unit or the operation unit responsive to the detected vibration of the digital camera.

14. The method of claim 11 further comprising:
g) receiving a manual user input by the operation unit; and
h) restoring the power supplied to at least one of the display unit or the operation unit responsive to the receipt of the manual user input by the operation unit.

15. The method of claim 11 wherein the display unit and the operation unit are integrated as a touch screen.

16. The method of claim 11 wherein the control signal is received by the digital camera from the external display device via an HDMI connection between the digital camera and the external display device.

17. The method of claim 11 wherein the received control signal is a freeze instruction.

18. The method of claim 11 wherein the image information transmitted by the digital camera for display on the external display device includes thumbnails of recorded images.

19. The method of claim 11 wherein the image information transmitted by the digital camera for display on the external display device includes a composite image including a live view video image and a still photographed image.

20. A photographing apparatus comprising:
a) an image capturing unit for generating an image signal from an obtained optical image of an object;
b) a display unit configured to display at least one of an image or photographing apparatus information;
c) an operation unit configured to receive manual user input instructions for controlling operations of the photographing apparatus;
d) a signal transmitter/receiver unit configured to (i) transmit a signal to a display device external to the photographing apparatus in order to display the image on the display device, and (ii) receive a control signal for the photographing apparatus from the display device; and
e) means for controlling (1) power supplied to the display unit and the operation unit to reduce the power supplied to at least one of the display unit or the operation unit responsive to the receipt of a control signal, from the display device, by the signal transmitter/receiver unit, and (2) the image capturing unit, the signal transmitter/receiver unit, the display unit, and the operation unit,
wherein the control signal received from the display device is based on a remote control command transmitted from an external remote-control device, and received by the display device, and the control signal is based on whether the external remote-control device is operated by a user,
wherein while the means for controlling reduces the power supplied to at least one of the display unit or the operation unit, it performs processing of switching of photographed images being transmitted by the signal transmitter/receiver unit in accordance with an operation of the external remote-control device based on the remote control command received by the display device, and
wherein when the means for controlling reduces the power supplied to at least one of the display unit or the operation unit responsive to the receipt of a control signal, from the display device, by the signal transmitter/receiver unit, it does so without turning off the power supplied to the photographing apparatus such that it remains operable to perform processing in accordance with an operation of the external remote-control device based on the remote control command received by the display device even while the power supplied to the at least one of the display unit or the operation unit is reduced.

* * * * *